April 29, 1924.
J. G. MORITZ
1,492,385
COMBINED EGG SEPARATOR AND LEMON SQUEEZER
Filed Nov. 2, 1923
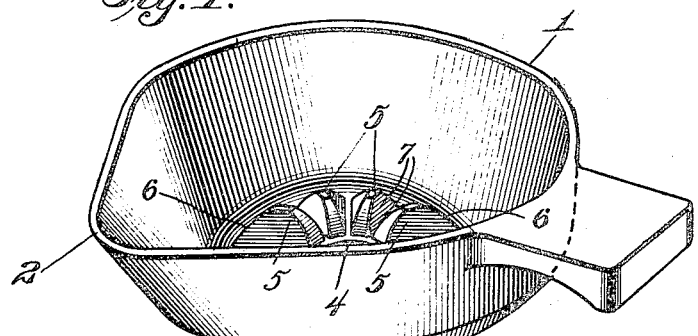
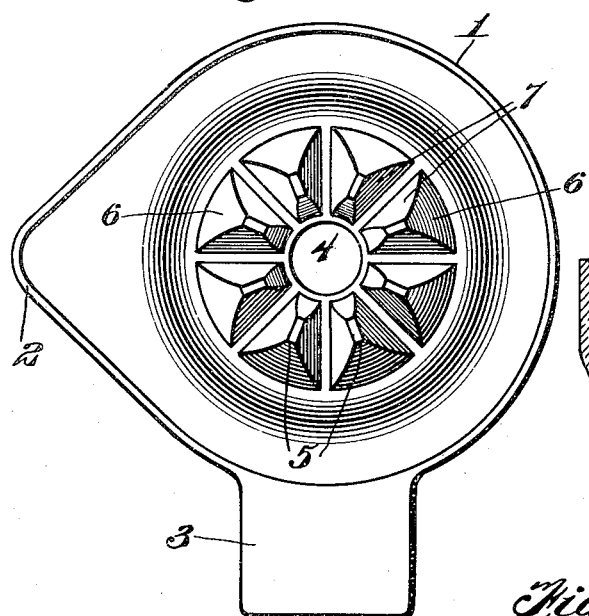
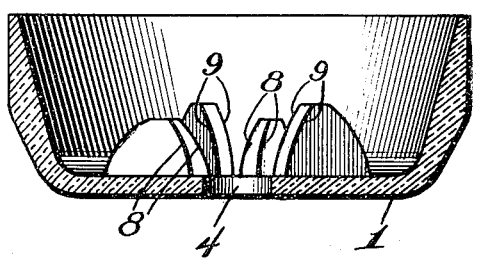
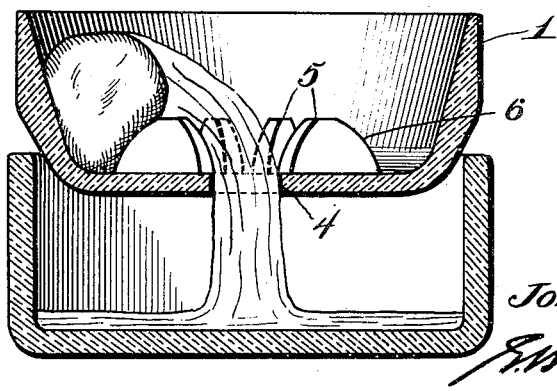
Inventor
John G. Moritz
Atty Patented Apr. 29, 1924.                                                1,492,385

UNITED STATES PATENT OFFICE.

JOHN G. MORITZ, OF GLASSPORT, PENNSYLVANIA.

COMBINED EGG SEPARATOR AND LEMON SQUEEZER.

Application filed November 2, 1923.  Serial No. 672,387.

*To all whom it may concern:*

Be it known that JOHN G. MORITZ, a citizen of the United States, residing at Glassport, in the county of Allegheny and State of Pennsylvania, has invented new and useful Improvements in Combined Egg Separators and Lemon Squeezers, of which the following is a specification.

It is a purpose of the present invention to provide, in a combined egg separator and lemon squeezer, a construction including a bowl or cup member with an opening in the bottom, with means surrounding the opening to prevent the yolk of the egg from passing through the opening while the white, due to its loose consistency, may pass freely through the opening into one receptacle over which the cup or bowl may be placed while the yolk may be poured out of a spout into another receptacle, said means for preventing the passage of the yolk through the opening also acting to crush and squeeze the cells of a half lemon when the lemon is engaged therewith, the juice of the lemon passing out of the opening in the bottom of the cup or bowl.

Another purpose is to provide a device of this kind wherein the means, such as upstanding projections surrounding the opening in the center of the bottom of the cup or bowl, may be of a substantial height and may be either beveled or straight on their opposite sides or some may be beveled and others straight, that is to say, alternately.

It is to be understood that the particulars herein given are in no way limitative and that, while still keeping within the scope of the invention, any desired modifications of detail and desired proportions may be made in the device according to the circumstances.

The invention comprises further features and combinations of parts to be hereinafter set forth, shown in the drawings and claimed.

In the drawings:

Figure 1 is a view in perspective of the improved combined egg separator and lemon squeezer constructed in accordance with the invention.

Figure 2 is a plan view.

Figure 3 is a sectional view showing the cup or bowl over a glass or other receptacle, the white in the act of passing through the central opening with the yolk retained between the separating projections and the wall of the cup, so that the yolk may be poured out of the spout.

Figure 4 is a sectional view showing the projections in the bottom of the cup as being alternately straight and beveled with some of one height and others of less height.

Referring to the drawings, 1 designates the cup or bowl as a whole and which may be of any suitable shape or proportions and constructed of any suitable material, either metal, porcelain, china or the like. In either case the cup or bowl may be of the general shape illustrated and provided with a spout 2 and a handle 3, the latter extending from the side of the cup or bowl in a position at right angles to the former.

The bottom of the cup is provided with a central opening 4 and rising from the bottom in surrounding relation to the opening is a plurality of upstanding projections 5. The surfaces 6 which merge from the bottom of the bowl or cup adjacent the wall thereof are curved toward the apexes of the projections while the edges of the projections nearest the opening are curved toward the tops of the projections. In other words, the projections in their radial areas are curved so that the outer surfaces of the projections may conform to the contour of a half lemon when placed over and forced down upon the projections when gouging out the cells of the lemon. The juice of the lemon will pass through the opening in the bottom of the cup or bowl.

While the illustrations in the drawings show the cup or bowl adapted for removing the cells of a lemon, it is to be understood that the projections may be made of a size for removing the cells of an orange or similar fruit.

In Figures 1, 2 and 3, the projections are beveled on their opposite sides, as at 7, while in Figure 4, the projections are alternately beveled and straight upon their opposite sides, as indicated at 8 and 9. In other words, certain of the projections have parallel vertical sides while others of the projections have beveled sides. The projections are disposed radially with relation to the central opening and in Figure 4, the projections are alternately of different heights.

In operation, in using the device as an egg separator, the cup may be placed over a glass or other receptacle, the shell of the egg is then broken is such wise as not to injure the yolk, the contents of the shell are allowed to fall into the cup between the projections and the marginal wall. The white of the egg, being of a more loose consistency than the yolk, will pass between the projections and flow out through the opening into the glass or receptacle over which the cup is disposed. The yolk will be retained between the projections and the marginal wall. After the white of the egg empties, the cup may be removed from the glass and tilted and the spout disposed over another glass or other receptacle for emptying the yolk. A device of this kind may be used for separating more than one egg at a time. In other words, several eggs may be broken over the cup, the white passing off with the yolks retained, it then being possible to empty several yolks by way of the spout.

In using the device as a lemon squeezer, the lemon is first cut in half and each half is placed over the projections and pressed down and rotated, gouging out the cells of the lemon, the juice passing off through the central opening into a glass or other receptacle upon which the cup may rest.

The invention having been set forth, what is claimed is:

1. As an article of manufacture, a cup body provided with a central opening in its bottom, a plurality of projections rising from the bottom and in surrounding radial relation to the opening, said projections having their remote outer faces spaced from the marginal wall of the cup body, thereby causing a channel to be formed between the projections and the marginal wall for the reception of the yolk of an egg while the white of the egg passes between the projections and out through the central opening, certain of the projections having upstanding parallel sides, others of said projections having beveled sides, those having the upstanding parallel sides being of less height than those having the beveled sides, said cup including a discharging spout and provided with a handle.

2. As an article of manufacture, a cup body provided with a central discharge opening in its bottom, a plurality of projections rising from the bottom of the body and in surrounding radial relation to and between the opening and the marginal wall of the cup body, said projections having their remote outer faces spaced from the marginal wall of the cup body, thereby causing a channel to be formed between the projections and the marginal wall for the reception of the yolk of an egg, the upper terminal portions of the projections being free and unattached and the projections relatively spaced in radial relation, thereby permitting the white of an egg to flow readily between the projections and out through the central discharge opening while the yolk remains in said channel.

In testimony wherof he affixes his signature.

JOHN G. MORITZ.